(12) United States Patent
Hung

(10) Patent No.: US 7,578,031 B2
(45) Date of Patent: Aug. 25, 2009

(54) HINGE STRUCTURE WITH AUXILIARY ROLLER UNIT

(75) Inventor: Lin-Kai Hung, Sanchong (TW)

(73) Assignee: Protorsion Hinge Co., Ltd., Taipei County (TW)

( * ) Notice: Subject to any disclaimer, the term of this patent is extended or adjusted under 35 U.S.C. 154(b) by 0 days.

(21) Appl. No.: 12/140,606

(22) Filed: Jun. 17, 2008

(65) Prior Publication Data

US 2008/0295288 A1    Dec. 4, 2008

(30) Foreign Application Priority Data

Jun. 2, 2008    (TW)  ............................. 97209623 U

(51) Int. Cl.
*E05C 17/64*    (2006.01)
(52) U.S. Cl. ............................. 16/342; 16/275; 16/337
(58) Field of Classification Search .................. 16/342, 16/341, 337, 297, 380, 381, 275
See application file for complete search history.

(56) References Cited

U.S. PATENT DOCUMENTS

| 301,164 | A | * | 7/1884 | Robson et al. | ................. | 16/335 |
| 5,276,945 | A | * | 1/1994 | Matsumura | ................... | 16/337 |
| 6,182,330 | B1 | * | 2/2001 | Novin et al. | ................... | 16/341 |
| 2007/0192994 | A1 | * | 8/2007 | Chuang | ........................ | 16/342 |
| 2007/0214605 | A1 | * | 9/2007 | Tu | ................................. | 16/342 |

\* cited by examiner

*Primary Examiner*—William L. Miller
(74) *Attorney, Agent, or Firm*—Rosenberg, Klein & Lee

(57) ABSTRACT

A hinge structure includes a knuckle having inner and outer surfaces, the inner surface being punched to protrude outwardly thereby forming a working surface defining a working region and a locking surface defining a locking region in spatial communication with the working region. The knuckle further has a slot axially extending through the inner and outer surfaces at the working region to provide resiliency thereof. A pivot shaft extends into the working region, and has a locking section and a working section. A roller unit is disposed within the locking region in such a manner to contact the shaft. When the locking section is aligned with the roller unit, the shaft is locked to the knuckle due to biasing action of the locking surface. When the working section is aligned with the roller unit, the shaft possesses a torque due to biasing action of the knuckle.

12 Claims, 9 Drawing Sheets

HINGE STRUCTURE WITH AUXILIARY ROLLER UNIT

FIELD OF THE INVENTION

The present invention relates to a hinge structure, and more particularly to a hinge structure having an auxiliary roller unit for locking a pivot shaft within a knuckle.

BACKGROUND OF THE INVENTION

In our daily life, a hinge structure is implemented when two elements are required to be folded relative to each other. The hinge structure available presently generally consists of a male member and a female member. The male member generally includes a pivot shaft and a connection portion while the female member includes a knuckle and a connection portion. Under the normal condition, the pivot shaft extends rotatably into the knuckle while one object is mounted on the connection portion. Another object is mounted on the connection portion of female member such that the two objects can be folded onto or unfolded away from each other about an axis of the pivot shaft.

In actual practice, a positioning device is disposed between the pivot shaft and the knuckle in order to lock the male and female members together. The most commonly know positioning devices include flexible elements, hooks, mortise and dovetail structures and groove-and-tongue engagements.

FIG. 1 shows an exploded view of a conventional hinge structure. FIG. 2 shows a cross-sectional view of the conventional hinge structure in a working condition. FIG. 3 shows a cross-sectional view of the conventional hinge structure in a locking condition. As illustrated, the conventional hinge structure 1 includes a female member 11, a male member 12 and a flexible unit 13.

The female member 11 has a knuckle 111 and a connection portion 112 extending from the knuckle 111. The connection portion 112 is formed with two connection holes 1121, 1122. The male member 12 has a pivot shaft 121 extending rotatably into the knuckle 111 and a connection portion 122 extending from the pivot shaft 121. The male member 12 further has a connection portion 122 extending from the pivot shaft 121 and formed with two connection holes 1221, 1222. The pivot shaft 121 when in cross section has an axis AO and defines a peripheral locking section 1211 and a peripheral working section 1212 adjacent to the peripheral locking section 1211. The peripheral locking section 1211 includes a straight line or the locking section 1211 extends along a straight line.

The flexible unit 13 is disposed within the knuckle 111, and has seating section 131 in the form of a recess for receiving the pivot shaft 121 and two flexible parts 132, 133 extending from the seating section 131 in such a manner to contact the knuckle 111. The seating section 131 has a width smaller than the length of the working section 1212. 1212

Referring to FIG. 2, when the peripheral working section 1212 is aligned with the seating section 131, the pivot shaft 121 possesses a torque due to said biasing action of said flexible unit 13. At this time, the conventional hinge structure 1 is disposed in the working state.

Referring to FIG. 3, in case the pivot shaft 121 is rotated within the knuckle 111 in the arrow direction (10) (i.e. about its axis AO) such that the peripheral locking section 1211 is aligned with the seating section 131, the pivot shaft 121 is locked to the knuckle 111 due interference between the width of the seating section 131 and the length of the peripheral locking section 1211. At this time, the conventional hinge structure 1 is disposed in the locking state.

As is known in the art, there always exist two turning angles C1, C2 between the peripheral locking section 1211 and a peripheral working section 1212 and another two turning angles C3, C4 between the seating section 131 and two flexible parts 132, 133.

Rotation of the pivot shaft 121 about its axis AO within the knuckle 111 results in severe wear whenever the turning angle C1, C2 of the pivot shaft 121 collides against the turning angle C3, C4 of the flexible unit 13, thereby preventing smooth rotation of the pivot shaft 121 in the knuckle 111 and consequently shortening the service life of the conventional hinge structure 1.

SUMMARY OF THE INVENTION

The present invention is to provide a hinge structure that permit smooth rotation of a pivot shaft so as to eliminate the drawback of the prior art technology. The main object of the present invention is to provide a hinge structure including a roller unit disposed between the seating portion and the pivot shaft and simultaneously correct the periphery of the pivot shaft in such a manner to enable smooth rotation of the same.

In accordance with the present invention, a hinge structure is provided to include a knuckle, a pivot shaft and an auxiliary roller unit. The knuckle has an inner wall surface and outer wall surface. The inner wall surface is punched to protrude outwardly thereby forming a working surface defining a working region and a locking surface defining a locking region in spatial communication with the working region. The knuckle further has a slot axially extending through the inner and outer wall surfaces at the working region to provide resiliency thereof. The pivot shaft extends into the knuckle, and has a peripheral locking section and a peripheral working section adjacent to the peripheral locking section. The auxiliary roller unit is disposed within the locking region in such a manner to contact the pivot shaft. When the peripheral locking section is aligned with the roller unit, the pivot shaft is locked to the knuckle due to biasing action of the locking surface. When the peripheral working section is aligned with the roller unit, the pivot shaft possesses a torque due to biasing action of the locking surface of the knuckle.

When the peripheral locking section is aligned with the auxiliary roller unit, the pivot shaft is locked to the knuckle due to biasing action of the knuckle. When the peripheral working section of the pivot shaft is aligned with the auxiliary roller unit, the pivot shaft possesses a torque due to the biasing action of the knuckle. The auxiliary roller unit may include a cylindrical roller, a plurality of rolling balls or combination of the cylindrical roller and the rolling ball.

In the preferred embodiment of the present invention, the peripheral working section of the pivot shaft extends along a straight line and is located adjacent to the peripheral locking section. The pivot shaft further has two curve guide sections at adjoining areas between the peripheral working section and the peripheral locking section such that approach of the curved guide section toward the auxiliary roller unit results in biasing action of the knuckle against the pivot shaft due to the axial slot, thereby locking the pivot shaft relative to the knuckle.

When compared to the conventional hinge structure, the hinge structure of the present invention includes an auxiliary roller unit disposed within the locking region in such a manner to contact the pivot shaft. The pivot shaft employed in the preferred embodiment has a smooth periphery and is free of turning angles. The roller unit is circular in cross-section such that relative rotation between the pivot shaft and the roller unit enables smooth operation of the hinge structure of the present invention, thereby tremendously prolonging the service life thereof.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENTS

The hinge structure of the present invention is widely used in variety of structures when two elements are required to be folded relative to each other.

Figure 1:
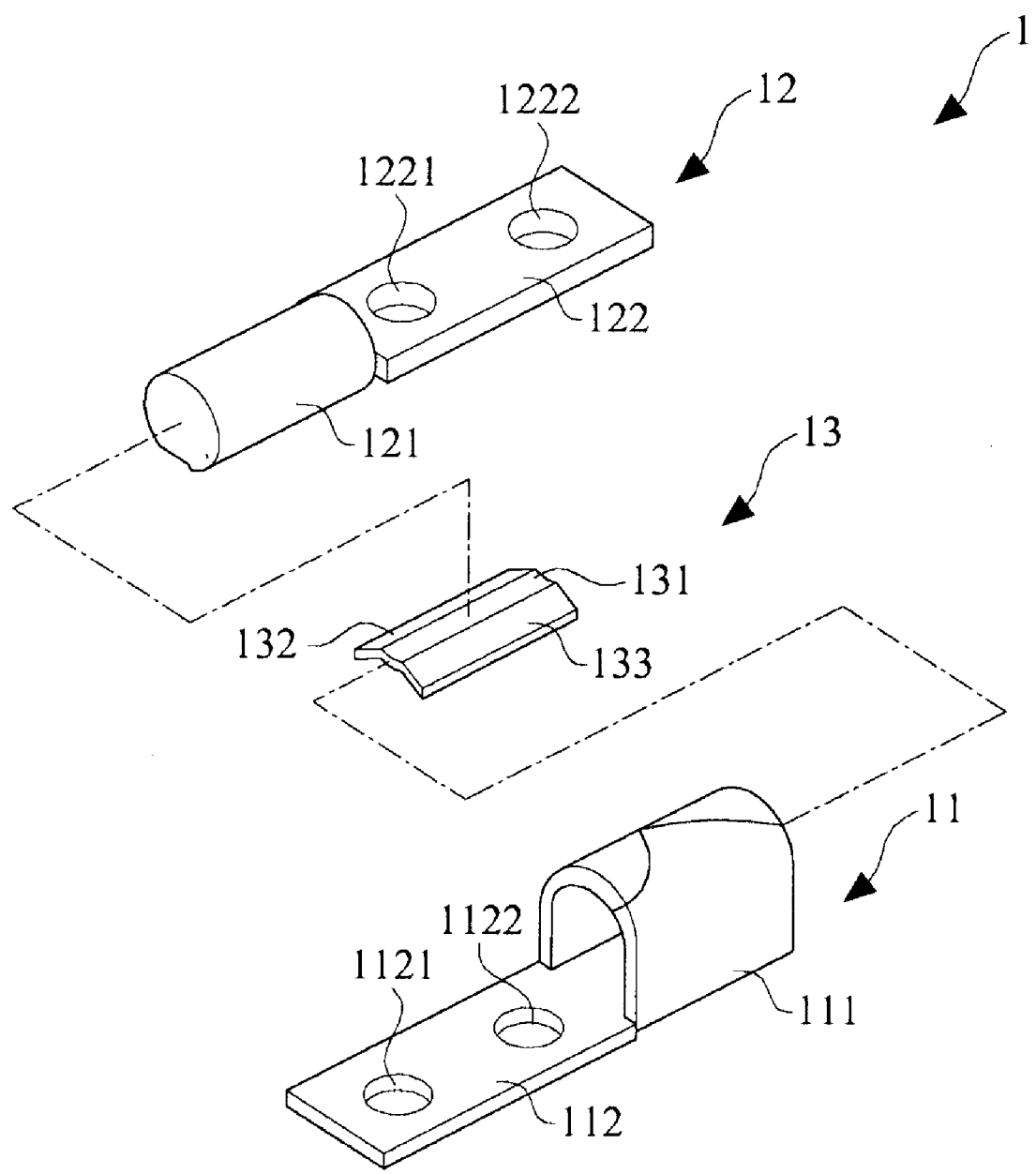
FIG. 1 is an exploded view of a conventional hinge structure.
Figure 2:
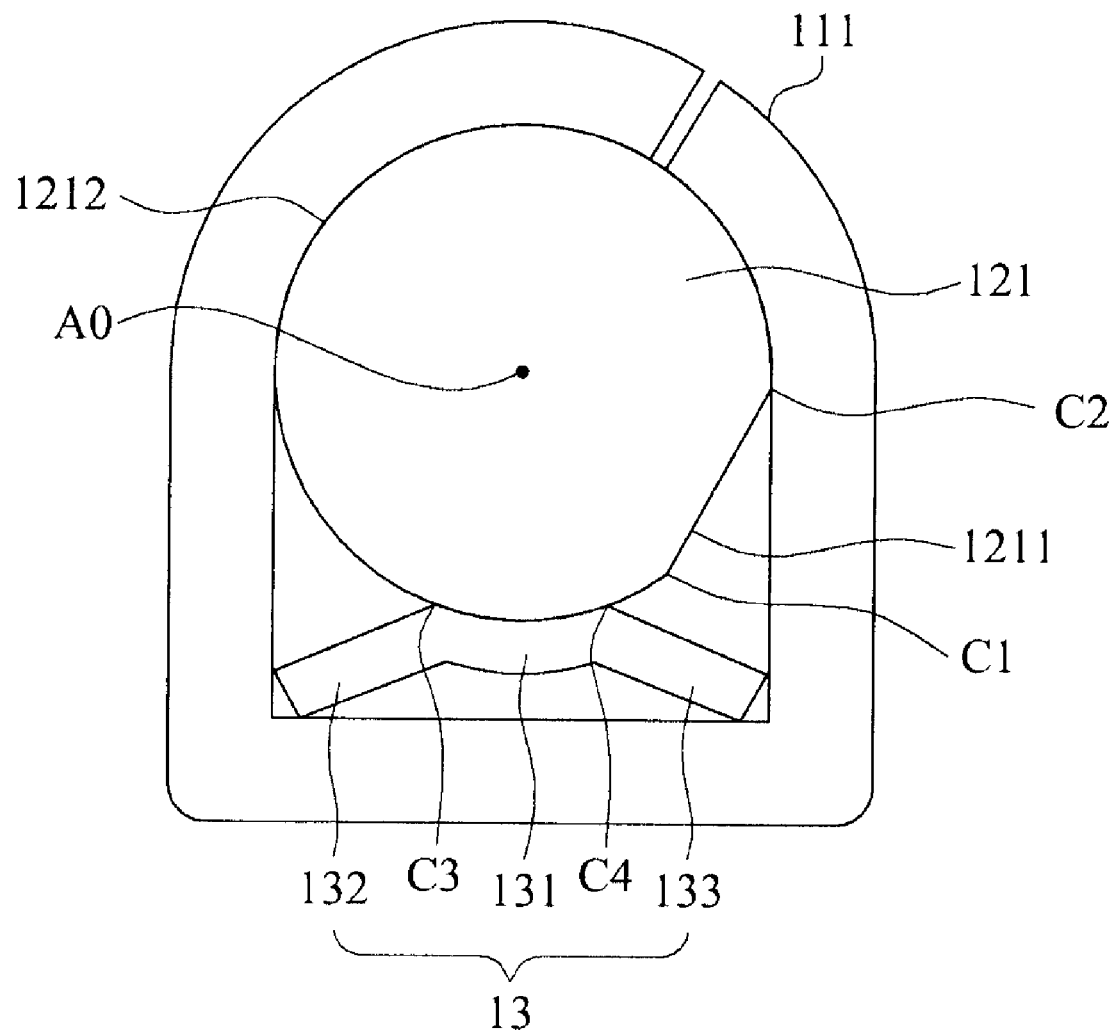
FIG. 2 is a cross-sectional view of the conventional hinge structure in a working condition.
Figure 3:
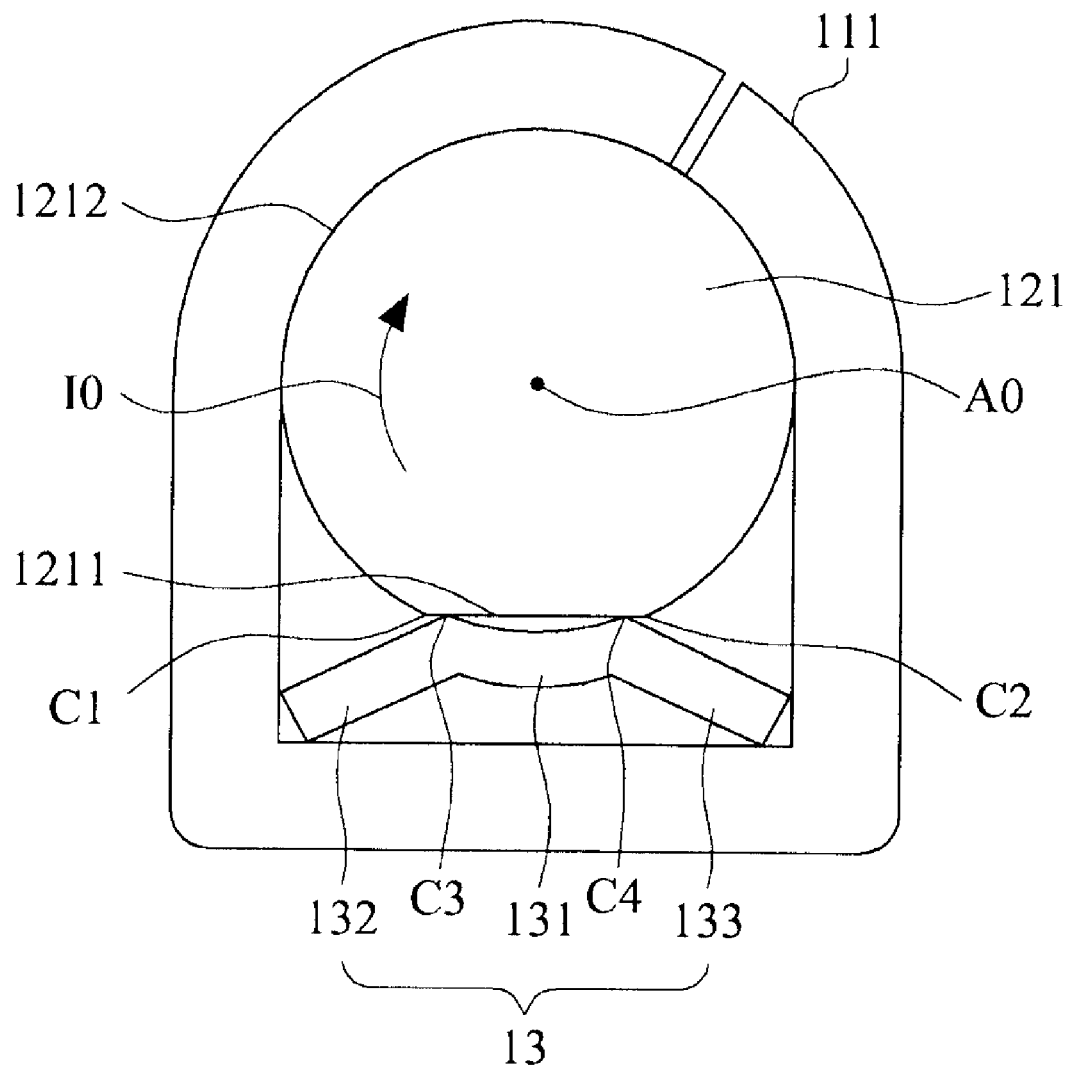
FIG. 3 is a cross-sectional view of the conventional hinge structure in a locking condition.
Figure 4:
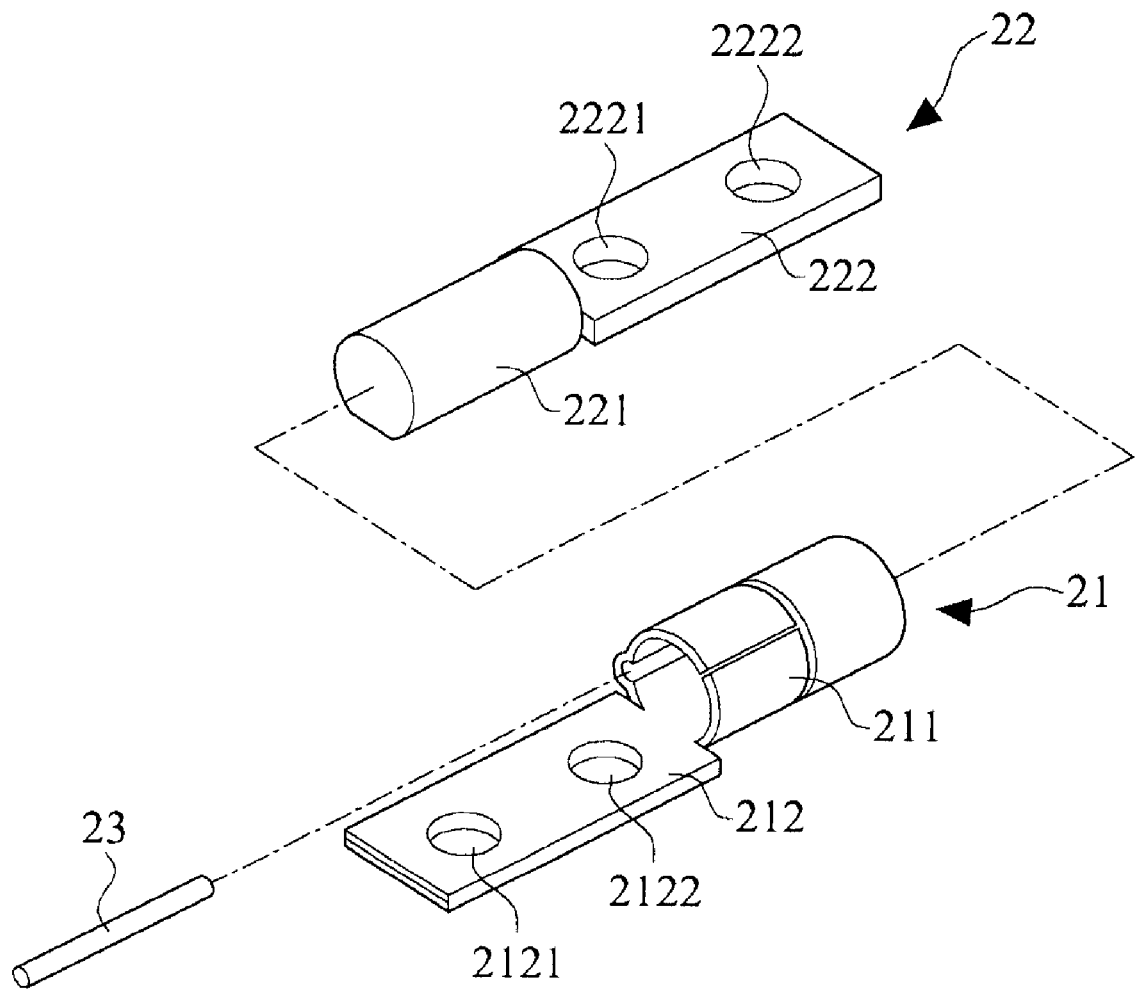
FIG. 4 is an exploded view of the first embodiment of a hinge structure of the present invention.
Figure 5:
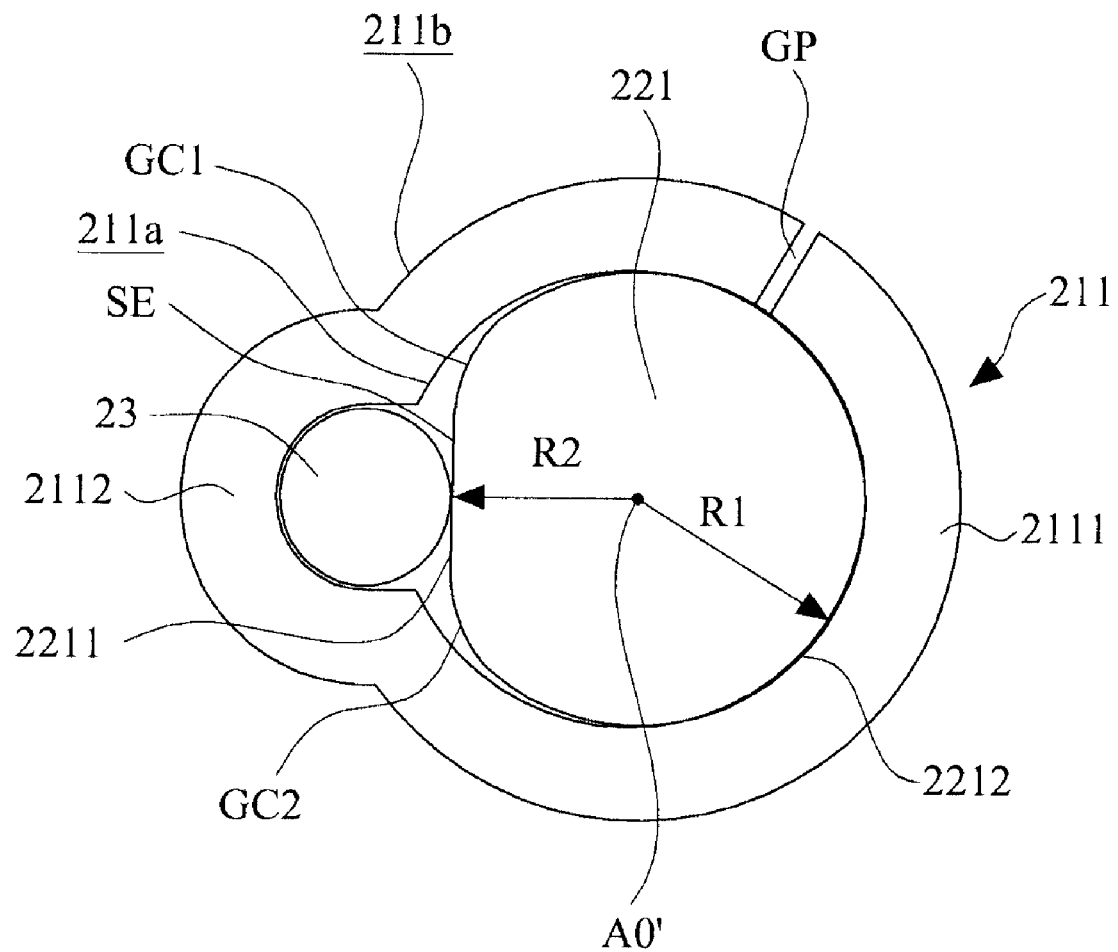
FIG. 5 is a cross-sectional view of the first embodiment of the hinge structure of the present invention in a locking condition.
Figure 6:
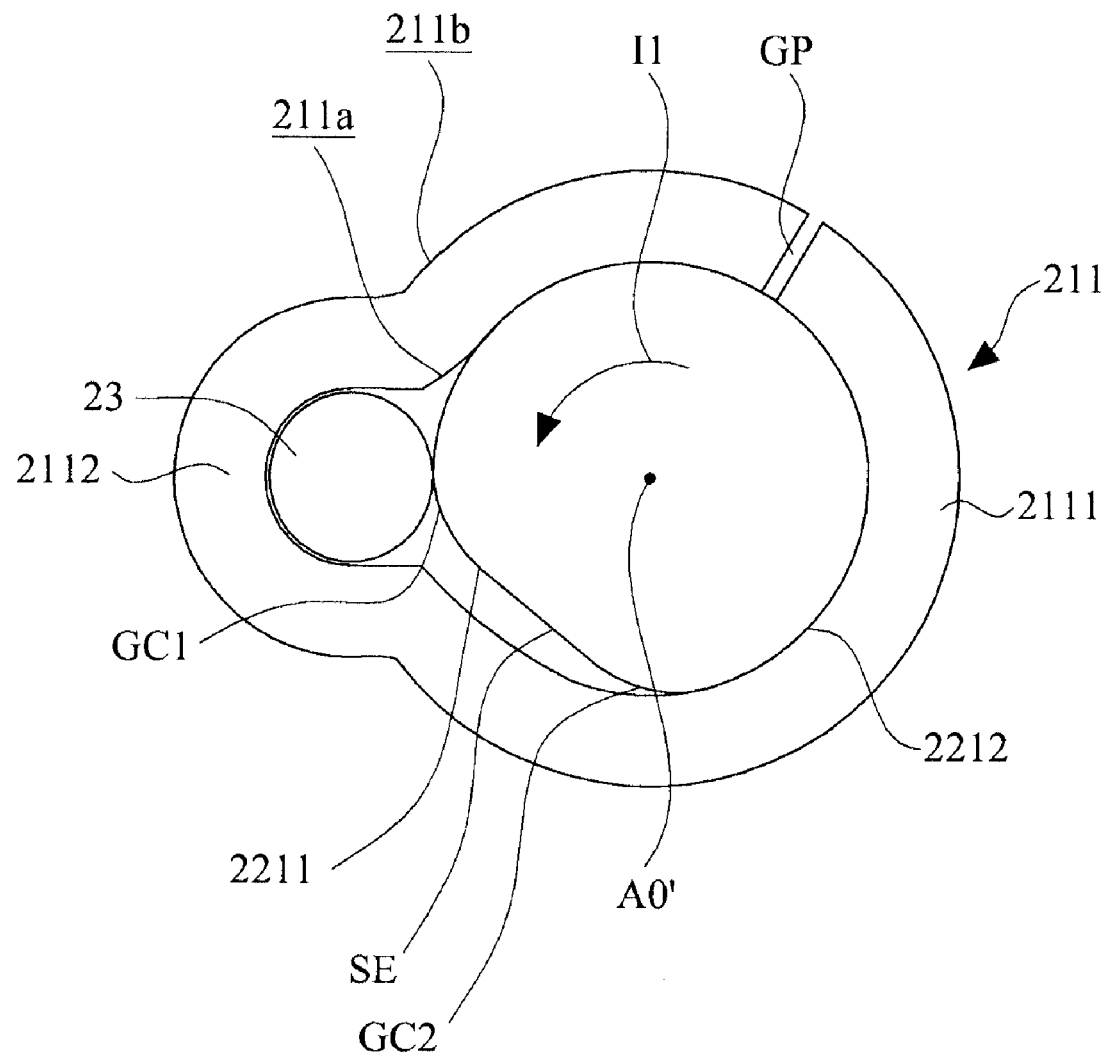
FIG. 6 is a cross-sectional view of the first embodiment of the hinge structure of the present invention in a working condition.

FIG. 4 is an exploded view of the first embodiment of a hinge structure of the present invention. FIG. 5 is a cross-sectional view of the first embodiment of the hinge structure of the present invention in a locking condition. FIG. 6 is a cross-sectional view of the first embodiment of the hinge structure of the present invention in a working condition. As illustrated, the hinge structure 2 accordingly includes a female member 21, a male member 22 and a roller unit 23.

The female member 21 includes a knuckle 211 and a female connection portion 212 extending from the knuckle 211. The female connection portion 212 is formed with two connection holes 2121, 2122 that are used for coupling with a first object (not show). The knuckle 211 has an inner wall surface 211a and outer wall surface 211b. The inner wall surface 211a is preferably punched to protrude outwardly and radially to form a protrusion on the outer wall surface 211b, thereby forming a large working surface defining a working region 2111 and a small locking surface defining a locking region 2112 in spatial communication with the working region 2111. The knuckle 211 further has a slot GP axially extending through the inner and outer walls 211a, 211b at a working region 2111 to provide resiliency thereof.

The male member 22 includes a pivot shaft 221 extending into the knuckle 211, and has in cross-section an axis AO' a peripheral locking section 2211 and a peripheral working section 2212. The peripheral locking section 2211 extends along a straight line SE. In other words, the periphery of the pivot shaft 221 is generally circular except for the peripheral working section 2212, which is located adjacent to the peripheral locking section 2211. The pivot shaft 221 has two curve guide sections GC1, GC2 disposed between and interconnecting the peripheral locking section 2211 and the peripheral working section 2212. In other words, the pivot shaft 221 is free of turning angles in cross section. The pivot shaft 221 further has an axis AO' and defines a first distance R1 measured from the axis AO' to the peripheral working section 2212 and a second distance R2 measured from the axis AO' to the peripheral locking section 2211, where R1>R2. The male member 22 further includes male connection portion 222 extending from the pivot shaft 221 and formed with two connection holes 2221, 2222 that are used for coupling with a second object (not show). Thus, the first and second objects can be folded onto each other or unfolded relative to each other. The roller unit 23 disposed within the locking region 2112 in such a manner to contact the pivot shaft 221. In the first embodiment, a cylindrical roller 232 is used for the roller unit 23.

As illustrated in FIG. 5, the approach of the curve guide section GC1, GC2 of the locking section 2211 towards the roller unit 232 results in biasing action of the locking surface defining a locking region 2112 against the cylindrical roller 232, thereby aligning the peripheral locking section 2211 with the cylindrical roller 232 and locking the pivot shaft 221 to the knuckle 211. Under this condition, the hinge structure 2 of the present invention is in the locking condition.

As illustrated in FIG. 6, when the pivot shaft 221 is rotated relative to the knuckle 211 about the axis AO' as shown by the arrow 11 so as to align the peripheral working section 2212 with the cylindrical roller 232. At this time, the pivot shaft 221 possesses a torque due to the biasing action of the locking surface defining the locking region 2112 against the cylindrical roller 232. Under this condition, the hinge structure 2 of the present invention is in the working condition.

When compare to the conventional hinge structure, the pivot shaft of the present hinge structure has the straight locking section 2211 and two curve guide sections GC1, GC2 that slide smoothly over the cylindrical roller 232 with circular cross section. In other words, rotation of the pivot shaft 221 within the knuckle 211 is smooth regardless of position of the pivot shaft 221 with respect to the knuckle 211, thereby prolonging the service life of the present hinge structure.

Figure 7:
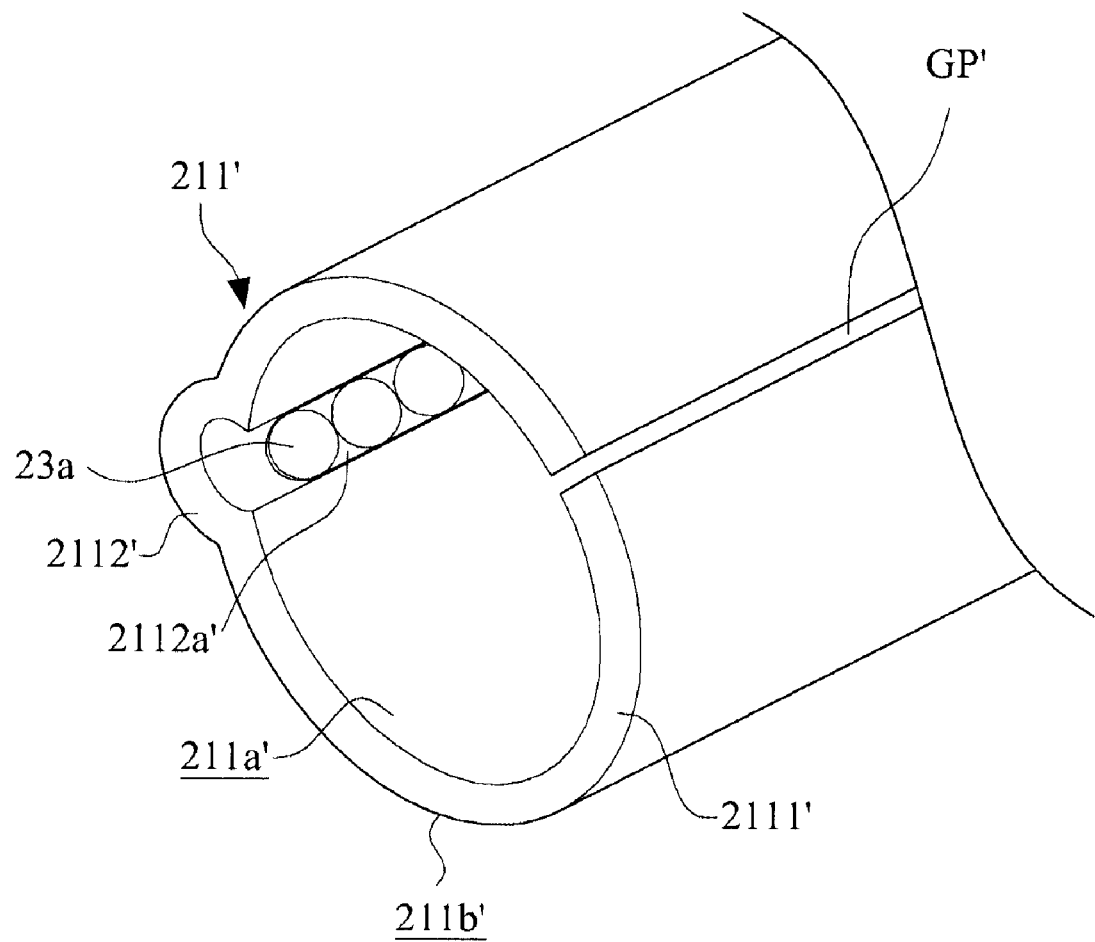
FIG. 7 is a cross-sectional view of the second embodiment of the hinge structure of the present invention in a locking condition.

FIG. 7 is a partly view of the second embodiment of the hinge structure of the present invention in a locking condition. As illustrated, the knuckle 211' has an inner wall surface 211a' and an outer wall surface 211b'. The inner wall surface 211a' is punched to protrude outwardly thereby forming a working surface defining a working region 2111' and a locking surface defining a locking region 2112' in spatial communication with the working region 2111'. The knuckle 211' further has a slot GP' axially extending through the inner and outer wall surfaces 211b', 211a' at the working region 2111' to provide resiliency thereof.

The locking surface defining the locking region 2112' is formed with an axially extending channel 2112a'. In other words, the protrusion is formed axially on the outer surface of the knuckle. The roller unit 23 includes a plurality of rolling balls 23a disposed rotatably in the channel 2112a'.

Figure 8:
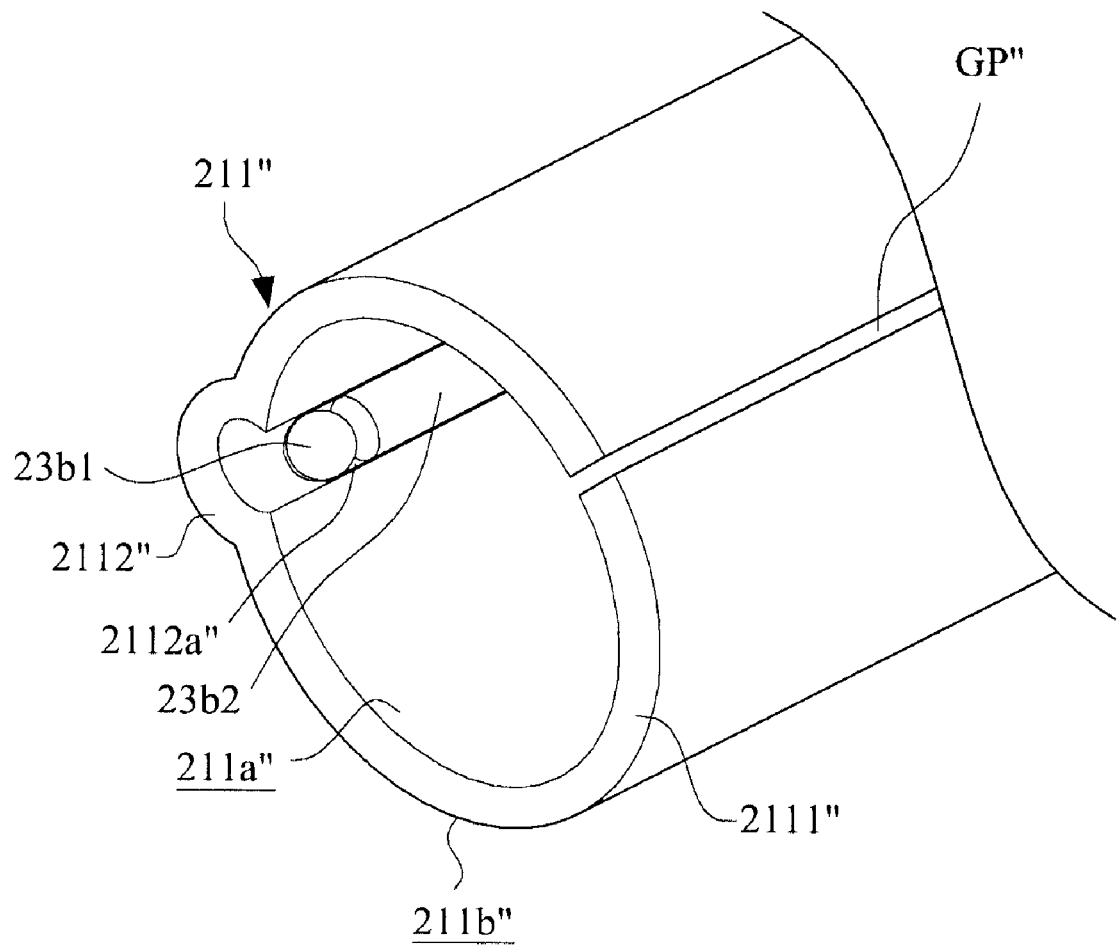
FIG. 8 shows an exploded view of a flexible locking assembly employed in the third embodiment of the hinge structure of the present invention.

FIG. 8 shows a partly view of the third embodiment of the hinge structure of the present invention. The knuckle 211" has an inner wall surface 211a" and an outer wall surface 211b". The inner wall surface 211a" is punched to protrude outwardly thereby forming a working surface defining a working region 2111" and a locking surface defining a locking region 2112" in spatial communication with the working region 2111". The knuckle 211" further has a slot GP" axially extending through the inner and outer wall surfaces 211b'', 211a'' at the working region 2111'' to provide resiliency thereof.

The locking surface defining the locking region 2112'' is formed with an axially extending channel 2112a''. The roller unit 23 includes at least one rolling ball 23b1 and a cylindrical roller 23b2 disposed rotatably in the channel 2112a''.

Figure 9:
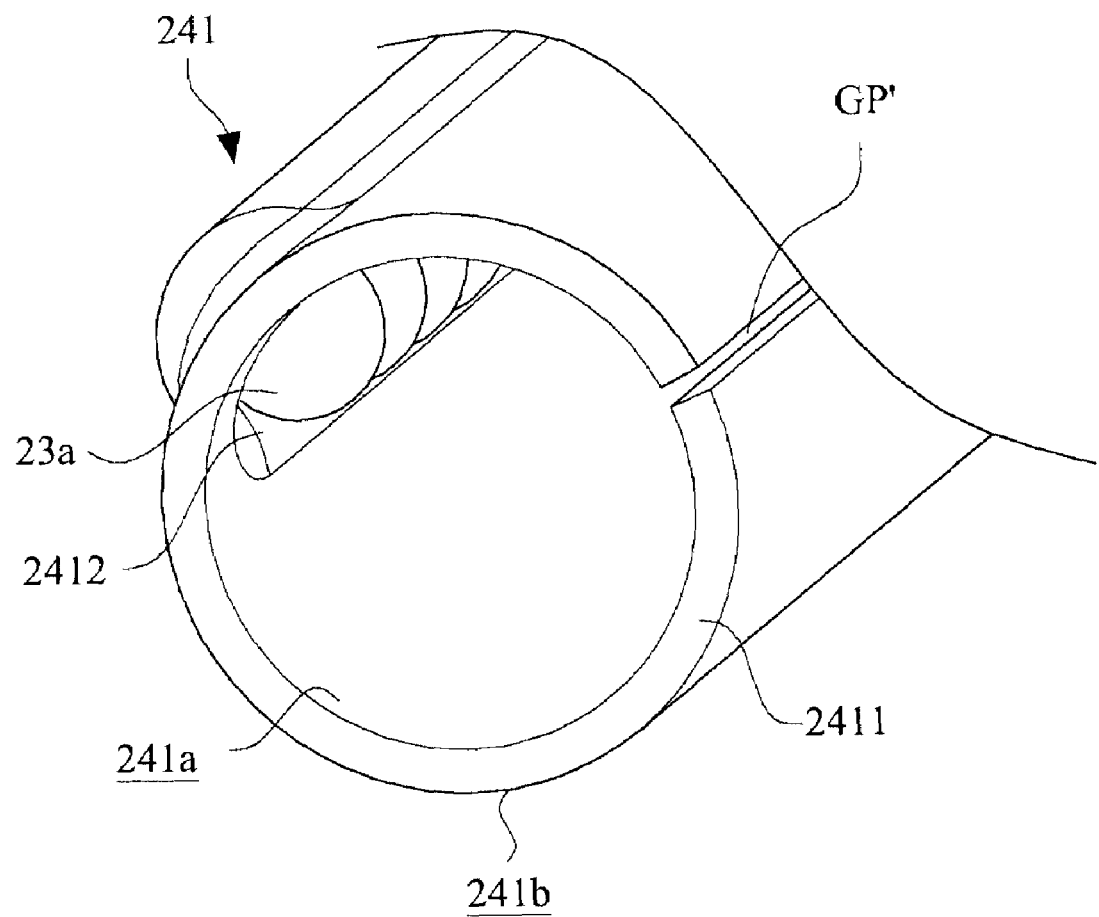
FIG. 9 is a partly view of the fourth embodiment of the hinge structure of the present invention.

FIG. 9 is a partly view of the fourth embodiment of the hinge structure of the present invention. As illustrated, the knuckle 241 has an inner wall surface 241a and an outer wall surface 241b. The inner wall surface 241a is punched to protrude outwardly thereby forming a working surface defining a working region 2411 and a locking surface defining a locking region 2412 in spatial communication with said working region 2411. The knuckle 241 further has a slot GP' axially extending through said inner and outer wall surfaces 241a, 241b at the working region 2411 to provide resiliency thereof. Unlike to the second embodiment, the locking surface defining the locking region 2412 is punched inwardly to two opposite ends of the knuckle 241 at the locking region 2412 in such a manner to form an axially extending channel.

In this embodiment, the opposite ends of the knuckle 241 serve as two restriction elements to prevent untimely removal of the rolling balls 23a constituting the roller unit 23.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A hinge structure comprising:
    a knuckle having an inner wall surface and outer wall surface, said inner wall surface being punched outwardly to form a protrusion on said outer wall surface and an axially extending channel on said inner wall surface, thereby forming a working surface defining a working region and a locking surface defining a locking region in spatial communication with said working region;
    a pivot shaft extending into said knuckle, and having a peripheral locking section and a peripheral working section adjacent to said peripheral locking section; and
    a roller unit rotatably disposed within said locking region to contact said pivot shaft;
    wherein, when said peripheral locking section is aligned with said roller unit, said pivot shaft is locked to said knuckle due to biasing action of said locking surface and when said peripheral working section is aligned with said roller unit, said pivot shaft possesses a torque due to biasing action of said locking surface.

2. The hinge structure according to claim 1, wherein said peripheral locking section includes a straight line.

3. The hinge structure according to claim 1, wherein said pivot shaft further has a curve guide section disposed between and interconnecting said peripheral locking section and said peripheral working section.

4. The hinge structure according to claim 1, wherein said pivot shaft has an axis and defines a first distance R1 measured from said axis to said peripheral working section and a second distance R2 measured from said axis to said peripheral locking section and where R1>R2.

5. The hinge structure according to claim 1, wherein said roller unit includes a cylindrical roller.

6. The hinge structure according to claim 1, wherein said roller unit includes a plurality of rolling balls.

7. The hinge structure according to claim 1, wherein said roller unit includes a cylindrical roller and at least one rolling ball.

8. The hinge structure according to claim 1, further comprising a female connection portion extending from and cooperating with said knuckle to form a female member.

9. The hinge structure according to claim 8, wherein said female connection portion is formed with at least one connection hole.

10. The hinge structure according to claim 1, further comprising a male connection portion extending from and cooperating with said pivot shaft to form a male member.

11. The hinge structure according to claim 10, wherein said male connection portion is formed with at least one connection hole.

12. The hinge structure according to claim 1, wherein said locking surface forms said axially extending channel at said locking region for receiving said roller unit therein.

* * * * *